United States Patent [19] [11] 3,636,411
Bulloch [45] Jan. 18, 1972

[54] CONTROL LOGIC SWITCHING FOR AN ON-OFF CONTROLLER

[72] Inventor: James E. Bulloch, Grenada, Miss.
[73] Assignee: The Bendix Corporation
[22] Filed: May 28, 1968
[21] Appl. No.: 732,567

[52] U.S. Cl. ............................317/137, 317/157, 244/3.22, 244/77
[51] Int. Cl. ..........................................F41g 7/00
[58] Field of Search ..............317/137, 123, 139, 5; 244/3.2, 244/3.21, 3.22, 77, 77 S

[56] References Cited

UNITED STATES PATENTS

| | | | |
|---|---|---|---|
| 3,350,886 | 11/1967 | Feraud et al. | 244/3.22 X |
| 2,549,020 | 4/1951 | Seldon | 317/137 X |
| 3,235,204 | 2/1966 | Shu Lee | 244/3.21 |
| 3,340,883 | 9/1967 | Peternel | 317/5 X |

Primary Examiner—Lee T. Hix
Assistant Examiner—C. L. Yates
Attorney—Anthony F. Cuoco and Plante, Arens, Hartz and O'Brien

[57] ABSTRACT

A switching device for an on-off controller. A signal corresponding to the desired value of a controlled variable is compared with an actual value signal for providing an error signal. The error signal, upon exceeding a predetermined threshold, is gated through normally closed signal switches for opening power switches to interrupt power to the controller. An error rate signal, upon exceeding a predetermined threshold, is gated to the signal switches for opening said switches whereupon the power switches are closed to apply power to the controller.

9 Claims, 2 Drawing Figures

INVENTOR.
JAMES E. BULLOCH

CONTROL LOGIC SWITCHING FOR AN ON-OFF CONTROLLER

BACKGROUND OF THE INVENTION

1. Field of the Invention

This invention relates to logic switching for an on-off controller and, more particularly, to logic switching for operating an on-off controller in response to controlled variable error and error rate signals.

2. Description of the Prior Art

The attitude of space vehicles such as communications satellites is controlled by stored gas reaction jets operated by on-off controllers. Prior to the present invention, attitude control was achieved at the expense of losses in stored gas and electrical energy. The present invention operates the controllers as a function of attitude error and attitude error rate to minimize these losses.

SUMMARY OF THE INVENTION

The desired value of a controlled variable is compared with the actual value of the variable for providing an error signal. In one embodiment of the invention a signal corresponding to error rate is summed with the error signal and the summed signal is passed through a threshold circuit into sign selective gates. Out of each gate the summed signal is passed through normally closed signal switches to normally open power switches. The error rate signal is passed through another threshold circuit and other sign selective gates, the output of which opens the normally closed signal switches causing the normally open power switches to close for providing power to the controllers.

In another embodiment of the invention the error signal is applied to the threshold circuit through a lead network. A signal corresponding to error rate is provided by combining the input and the output of the lead network and which combined signal is applied through the other threshold circuit and the other sign selective gates to close the power switches.

One object of this invention is to control the attitude of a space vehicle such as a communications satellite with a minimum loss of energy.

Another object of this invention is to control the attitude of the vehicle as a function of attitude error, and error rate.

Another object of this invention is to control the vehicle as a function of attitude error and sensed attitude error rate.

Another object of this invention is to control the vehicle as a function of attitude error and derived attitude error rate.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE INVENTION

Figure 1:
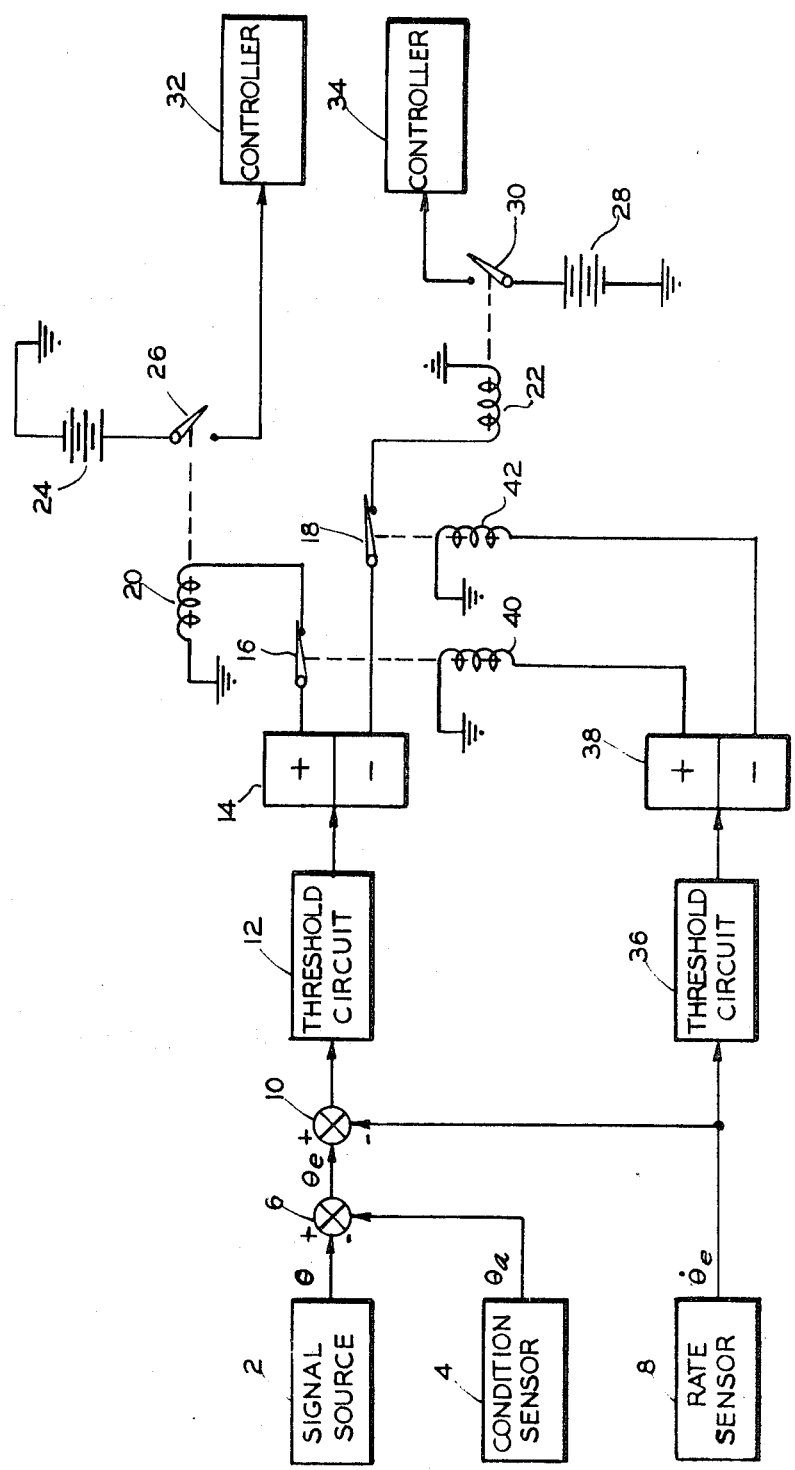
FIG. 1 is a block diagram showing an embodiment of the invention wherein sensed error rate is used.

With reference to FIG. 1, a signal source 2 provides a signal $\theta$ corresponding to a desired value of a variable to be controlled and which variable may be, for purposes of example, the attitude of a communications satellite in either the pitch, yaw or roll axes. A condition sensor 4 provides a signal $\theta_a$ corresponding to the actual value of the variable to be controlled. Signal $\theta$ from signal source 2 and signal $\theta_a$ from condition sensor 4 are applied to a summing means 6 which sums the signals and provides an error signal $\theta_e$ corresponding to the difference therebetween. Error signal $\theta_e$ is applied to a summing means 10.

A rate sensor 8 provides an error rate signal $\dot{\theta}_e$ and which signal is applied to summing means 10 and summed thereby with error signal $\theta_e$ from summing means 6. The signal from summing means 10 is applied to a threshold circuit 12 and therefrom to a sign-selective gate 14. When the signal from summing means 10 is positive and exceeds the threshold of threshold circuit 12, sign-selective gate 14 provides a signal which is applied through a normally closed switch 16 for energizing a relay 20, and when the signal from summing means 10 is negative and exceeds the threshold of threshold circuit 12, sign-selective gate 14 provides a signal which is applied through a normally closed switch 18 for energizing a relay 22.

A power source shown as a battery 24 is connected to a power switch 26 and a power source shown as a battery 28 is connected to a power switch 30. Switch 26 is opened by relay 20 which is energized by the signal from sign-selective gate 14 applied through switch 16, and switch 30 is opened by relay 22 which is energized by the signal from sign-selective gate 14 applied through switch 18. As long as switches 26 and 30 are open, power from batteries 24 and 28 to a controller 32 and to a controller 34, respectively, is interrupted.

It is to be noted that controllers 32 and 34 may be of the type which drive reaction jet nozzle valves in an on-off manner in accordance with the switching logic provided by the device of the present invention for controlling the attitude of the vehicle.

Thus, through the aforenoted logic, control is exercised according to the following basic switching line equation:

$$\theta_e + \tau\dot{\theta}_e = \pm C, \qquad (1)$$

wherein $\theta_e$ is the error between the desired and actual values of the condition, $\dot{\theta}_e$ is the error rate, $\tau$ is the ratio of error rate to error gain and $C$ is the threshold value of threshold circuit 12.

Signal $\dot{\theta}_e$ from rate sensor 8 is applied to a threshold circuit 36 and therefrom to a sign selective gate 38. When the signal from rate sensor 8 is positive and exceeds the threshold of threshold circuit 36, gate 38 provides a signal for energizing a relay 40, and when the signal from rate sensor 8 is negative and exceeds the threshold of threshold circuit 36, gate 38 provides a signal for energizing a relay 42. Switches 16 and 18 are opened by energized relays 40 and 42, respectively, whereupon relays 20 and 22 are deenergized closing power switches 26 and 30 for applying power from batteries 24 and 28 to controllers 32 and 34, respectively.

In the case of a positive output from gate 38, for example, an error rate in excess of the threshold of threshold device 36 causes switch 16 to open permitting power from battery 24 to controller 32. An error rate limit is thereby effected through threshold circuit 36 in series with rate sensor 8.

For certain applications it is considered desirable to use derived rate instead of sensed rate and which embodiment of the invention will now be described with reference to FIG. 2. The desired condition signal from signal source 2 is applied to a summing means 6 and summed thereby with the actual condition signal from condition sensor 4 to provide error signal $\theta_e$. Signal $\theta_e$ is applied to a lead network 11 and therefrom to a summing means 13. Signal $\theta_e$ is applied to summing means 13 and summed thereby with the signal from lead network 11. By subtracting the input to lead network 13 from its output, and which subtraction is accomplished by summing means 13, a signal $\dot{\theta}_e$ approximately proportional to error rate is obtained.

The signal from lead network 11 is applied to threshold circuit 12 and therefrom to sign-selective gate 14. The signal from sign-selective gate 14 passes through normally closed switches 16 or 18 in accordance with the polarity of the signal from threshold circuit 12 for energizing relays 20 or 22, respectively, to open switches 26 or 30 as heretofore explained with reference to FIG. 1.

The signal from summing means 13 is applied to threshold circuit 36 and therefrom to sign-selective gate 38. Sign-selective gate 38 provides a signal in accordance with the polarity of the signal from threshold circuit 36, and which signal energizes relays 40 or 42, respectively, for opening switches 16 and 18 and whereupon the switches 26 and 36 are closed so that power from batteries 24 and 28 passes to controllers 32 and 34 as heretofore explained with reference to FIG. 1.

It is apparent, therefore, that if the lead constant of lead network 11 is large compared to the lag constant, the switching line equation is approximately as follows:

$$\pm C = \theta_e + (\tau_1 - \tau_2)\dot{\theta}_e - \tau_2(\tau_1 - \tau_2)\ddot{\theta} + \tau_2^2(\tau_1 - \tau_2)\dddot{\theta}\ldots \quad (2)$$

or $$\pm C = \theta_e + \tau_1 \dot{\theta}_e, \quad (3)$$

wherein $\tau_1$ is the network lead time constant, $\tau_2$ is the network lag time constant, $\dot{\theta}_e$ is the error rate and $C$ is the threshold value of threshold circuit 12.

It is to be noted that threshold circuits 12, 36, gates 14, 38, summing means 6, 10 and lead network 11 are devices well known in the art, with the invention residing not in the particular elements but in their arrangement as shown in the drawings.

For purposes of illustration only, summing means 6, 10 may be summing amplifiers of the type described in *Electronics for Scientists*, Malmstadt, et al., Benjamin, New York 1963, at Pg. 354, FIG. 8–11. Gates 14, 38 may be a pair of unidirectional gates arranged to form a bidirectional gate such as described in *Pulse, Digital and Switching Waveforms*, Millman and Taub, McGraw-Hill, New York 1965, at Pgs. 627–641, FIGS. 17–2, 17–3. Threshold circuits 12, 36 may be of the type described in *Millman and Taub*, supra, Pg. 629 and lead network 11 may be of the type described in *Electronics for Scientists*, supra, Pg. 562–563.

Error rate limiting is effected through threshold circuit 36 as heretofore noted with reference to FIG. 1.

OPERATION

In accordance with the embodiment of the invention shown in FIG. 1, a signal corresponding to error plus error rate is provided by summing means 10. When this total signal exceeds the predetermined threshold value of threshold circuit 12 it is gated through sign-selective gate 14 for opening the appropriate power switch 26 or 30.

Figure 2:
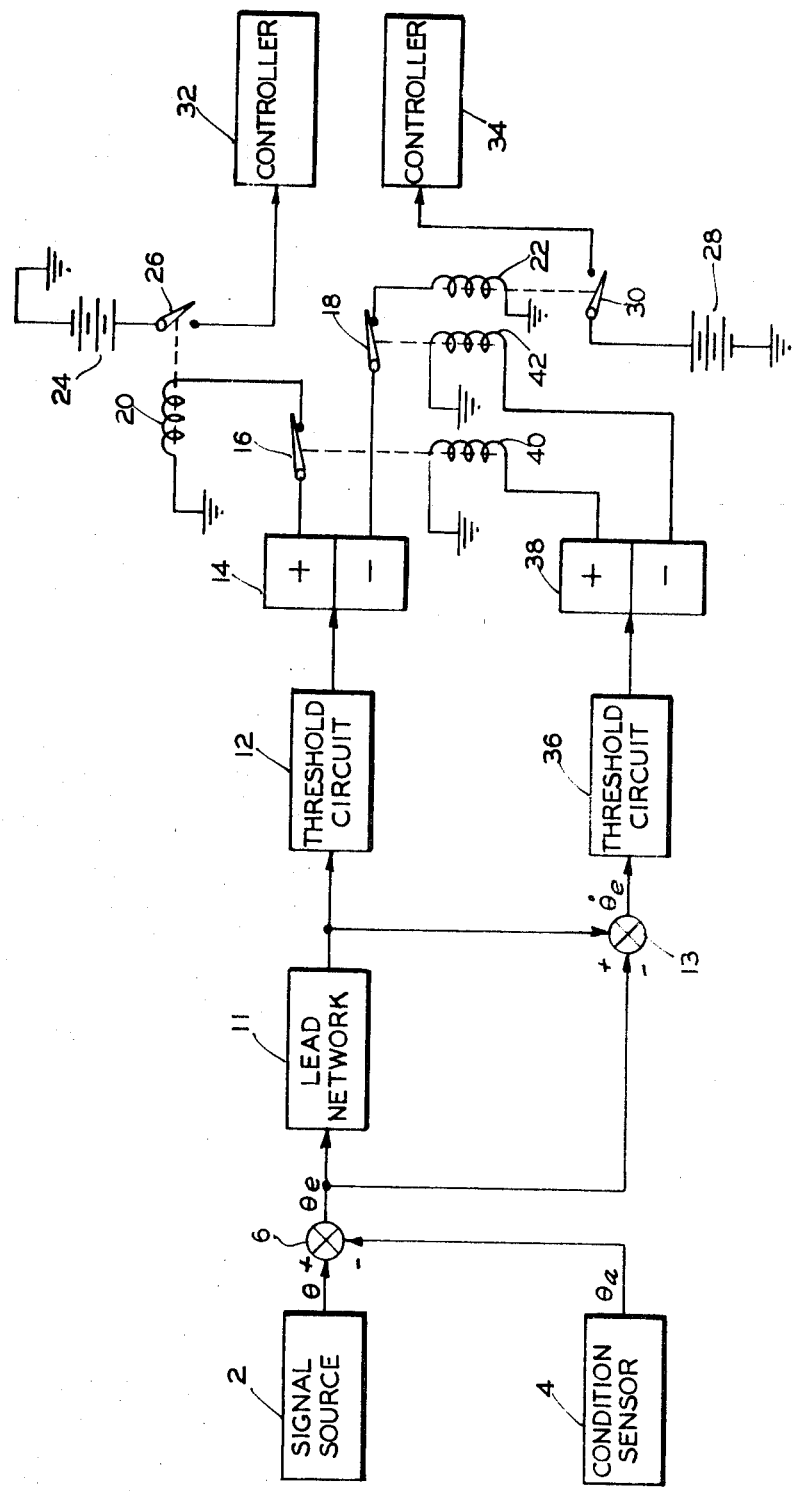
FIG. 2 is a block diagram showing an embodiment of the invention wherein derived error rate is used.

In accordance with the embodiment of the invention shown in FIG. 2, error signal $\theta_e$ is applied to lead network 11, and which lead network 11 has a long lead constant compared to its lag constant. When the output from lead network 11 exceeds the threshold of threshold circuit 12 it is gated through sign selective gate 14 for opening the appropriate power switch 26 or 30.

In order to minimize energy losses when controlling attitude by driving reaction jet nozzle valves through controllers 32 and 34, an error rate limit is provided. The limit is provided by applying error rate signal $\dot{\theta}_e$, either sensed as shown in FIG. 1 or derived as shown in FIG. 2, to threshold circuit 36, with the magnitude of the threshold thereof corresponding to the desired limit. Any error rate signal from sensor 8 (FIG. 1) or summing means 13 (FIG. 2) in excess of this threshold switches error signal $\theta_e$ out of the appropriate controller signal chain.

While two embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Switching apparatus for a controller, operated by an output from a power supply comprising:

means for providing a signal corresponding to a desired value of a controlled variable;

means for providing a signal corresponding to the actual value of the controlled variable;

means connected to the desired value signal means and to the actual value signal means for summing the signals therefrom and for providing an error signal;

means for providing a signal corresponding to the rate of change of the error signal;

means connecting the power supply to the controller and connected to the error signal means, and responsive to the error signal above a predetermined threshold for interrupting power from the power supply to the controller; and means connected to the rate of change signal means and to the last-mentioned means and responsive to the rate of change signal above a predetermined threshold for affecting said last-mentioned means to apply power from the power supply to the controller.

2. Apparatus as described by claim 1, wherein the means for providing a signal corresponding to rate of change of the error signal includes:

a lead network having an input connected to the error signal means and an output; and summing means connected to the error signal means and to the output of the lead network for summing the signals therefrom to provide the rate of change signal.

3. Apparatus as described by claim 1, wherein the means connecting the power supply to the controller and connected to the error signal means, and responsive to the error signal above a predetermined threshold for interrupting power from the power supply to the controller includes:

a first threshold circuit connected to the error signal means, and responsive to the error signal above a predetermined threshold for providing a first controlling output;

first gating means connected to the first threshold circuit and responsive to the first controlling output therefrom for providing a first energizing output; and first switching means connecting the power supply to the controller and connected to the first gating means, and responsive to the first energizing output therefrom for interrupting power to the controller.

4. Apparatus as described by claim 3, wherein the means connected to the rate of change signal means and to the last-mentioned means, and responsive to the rate of change signal above a predetermined threshold for affecting said last-mentioned means to apply power from the power supply to the controller includes:

a second threshold circuit connected to the rate of change signal means and responsive to the rate of change signal above a predetermined threshold for providing a second controlling output;

second gating means connected to the second threshold circuit and responsive to the second controlling output therefrom for providing a second energizing output; and second switching means connected to the first switching means and to the second gating means and responsive to the second energizing output from said second gating means for rendering said first switching means effective to apply power from the power supply to the controller.

5. Apparatus as described by claim 3, wherein the first switching means includes:

a normally closed first switch connected to the first gating means;

a first relay connected to the first switch;

a second switch connecting the power supply to the controller and being part of the first relay; and the energizing output from the first gating means being applied through the normally closed first switch for energizing the first relay to open the second switch thereby interrupting power from the power supply to the controller.

6. Apparatus as described by claim 5, wherein the second switching means includes:

a second relay connected to the second gating means and connected to the normally closed first switch, and energized by the second energizing output from the second gating means for opening said normally closed first switch whereupon the first relay is deenergized for closing the second switch to apply power from the power supply to the controller.

7. Apparatus as described by claim 3, wherein:

the first gating means is sign selective and provides the first energizing output in one sense when the first controlling output is above the predetermined threshold in the one sense, and provides the first energizing output in another sense when the first controlling output is above the predetermined threshold in the other sense.

8. Apparatus as described by claim 4, wherein:
the second gating means is sign selective and provides the second energizing output in one sense when the second controlling output is above the predetermined threshold in the one sense, and provides the second energizing output in another sense when the second controlling output is above the predetermined threshold in the other sense.

9. Apparatus as described by claim 3, including:
summing means connected to the difference signal means and to the rate of change signal means for summing the signals therefrom; and
the first threshold circuit being connected to said summing means and responsive to the signal therefrom above the predetermined threshold for providing the first controlling output.

* * * * *